US012208293B2

(12) United States Patent
Damaske

(10) Patent No.: US 12,208,293 B2
(45) Date of Patent: Jan. 28, 2025

(54) FALL ALERTING ASSEMBLY

(71) Applicant: Joey Damaske, Hixton, WI (US)

(72) Inventor: Joey Damaske, Hixton, WI (US)

( * ) Notice: Subject to any disclaimer, the term of this patent is extended or adjusted under 35 U.S.C. 154(b) by 883 days.

(21) Appl. No.: 17/363,211

(22) Filed: Jun. 30, 2021

(65) Prior Publication Data

US 2023/0001242 A1 Jan. 5, 2023

(51) Int. Cl.
*A62B 35/00* (2006.01)

(52) U.S. Cl.
CPC ................................ *A62B 35/0037* (2013.01)

(58) Field of Classification Search
CPC ............ A62B 35/0037; A62B 35/0018; A62B 35/0025; A62B 35/0075; A62B 35/04; G08B 25/016
See application file for complete search history.

(56) References Cited

U.S. PATENT DOCUMENTS

D454,986 S 3/2002 Casebolt
8,325,053 B2 * 12/2012 Flynt .................. A62B 35/0025 182/4
9,978,242 B2 5/2018 Ulner
10,138,102 B2 11/2018 Baillargeon
10,232,198 B2 3/2019 Cuny
10,722,739 B2 7/2020 Thompson
10,729,922 B2 8/2020 Huseth
2016/0027279 A1 * 1/2016 Ulner .................. G08B 25/016 340/573.1

FOREIGN PATENT DOCUMENTS

EP 3319059 5/2018
WO WO-2019229563 A1 * 12/2019 ........... A61B 5/0022

* cited by examiner

*Primary Examiner* — Brian D Mattei
*Assistant Examiner* — Jacob G Sweeney

(57) ABSTRACT

A fall alerting assembly for contacting emergency responders when a user falls from an elevated location includes a personal electronic device that is in wireless communication with an extrinsic communication network. A body harness is wearable on a body of a user, an attachment is movably coupled to the body harness and the attachment is attachable to a safety line. A cord is coupled to the attachment, a fall unit is integrated into the body harness and the cord is removably coupled to the fall unit. The cord breaks away from the fall unit when the user falls from the elevated location. Additionally, the fall unit broadcasts an alert signal to the personal electronic device when the cord breaks away from the fall unit to alert emergency responders to assist the user.

6 Claims, 6 Drawing Sheets

FALL ALERTING ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to alerting devices and more particularly pertains to a new alerting device for contacting emergency responders when a user falls from an elevated location. The device includes a body harness, a fall unit that is integrated into the body harness and a wrist monitor for monitoring the user's vital signs. The fall unit is in communication with a personal electronic device and the fall unit broadcasts an alert to the personal electronic device when the user falls from the elevated location. In this way the personal electronic device can contact emergency responders to assist the user.

(2) Description of Related Art Including Information Disclosed Under 37 CFR 1.97 and 1.98

The prior art relates to alerting devices including a design for a body harness in a fall arresting system. The prior art discloses a fall alert device that includes a transmitter integrated into a fall arrest system to broadcast an alert signal when a user falls in the fall arrest system. The prior art discloses a fall arrest system for using with an aerial lift bucket. The prior art discloses a system and method of detecting a fall in a fall arrest system and notifying wireless devices that are located in proximity to the fall arrest system.

BRIEF SUMMARY OF THE INVENTION

An embodiment of the disclosure meets the needs presented above by generally comprising a personal electronic device that is in wireless communication with an extrinsic communication network. A body harness is wearable on a body of a user, an attachment is movably coupled to the body harness and the attachment is attachable to a safety line. A cord is coupled to the attachment, a fall unit is integrated into the body harness and the cord is removably coupled to the fall unit. The cord breaks away from the fall unit when the user falls from the elevated location. Additionally, the fall unit broadcasts an alert signal to the personal electronic device when the cord breaks away from the fall unit to alert emergency responders to assist the user.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
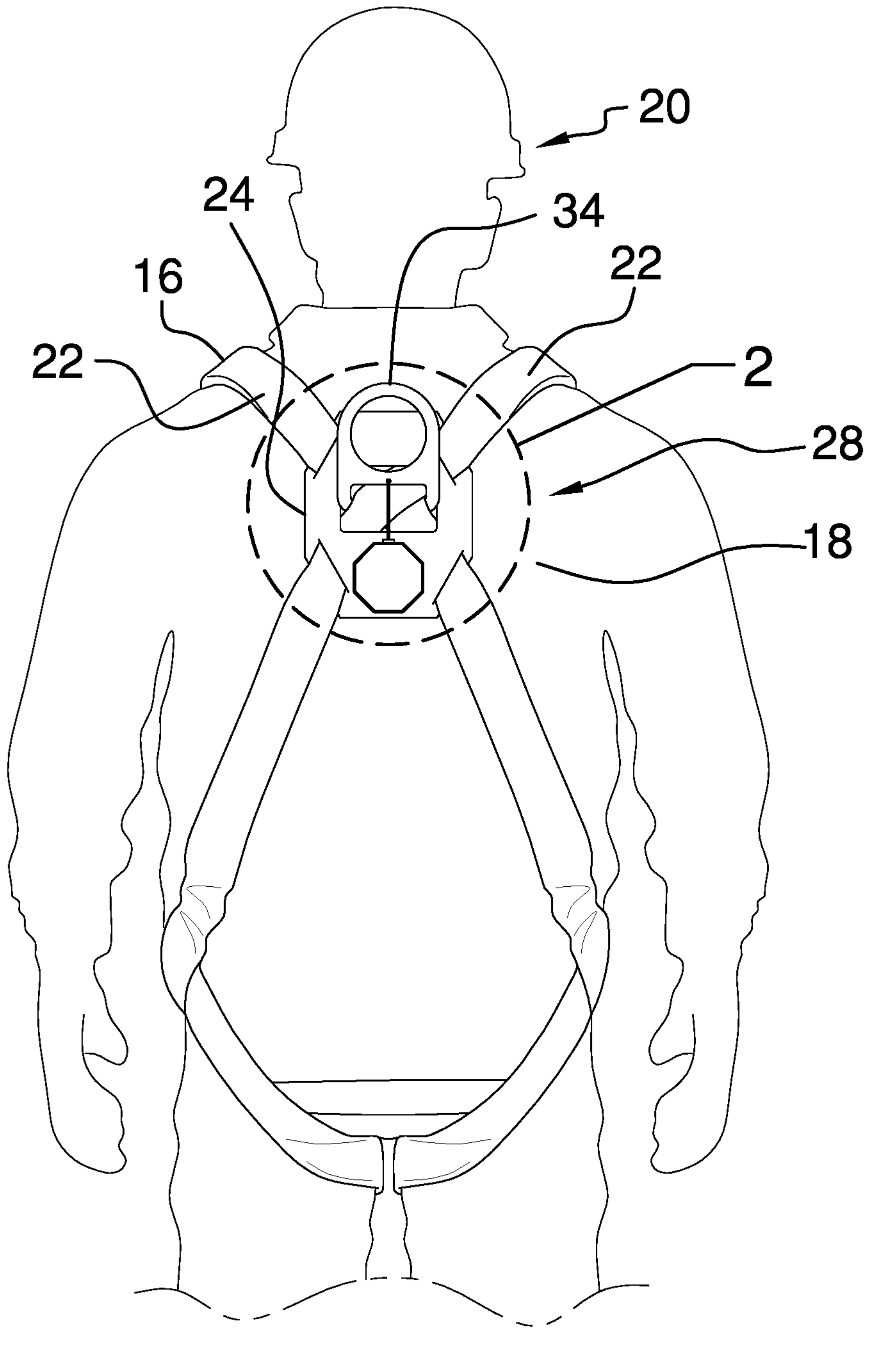
FIG. 1 is a back view of a fall alerting assembly according to an embodiment of the disclosure.
Figure 2:
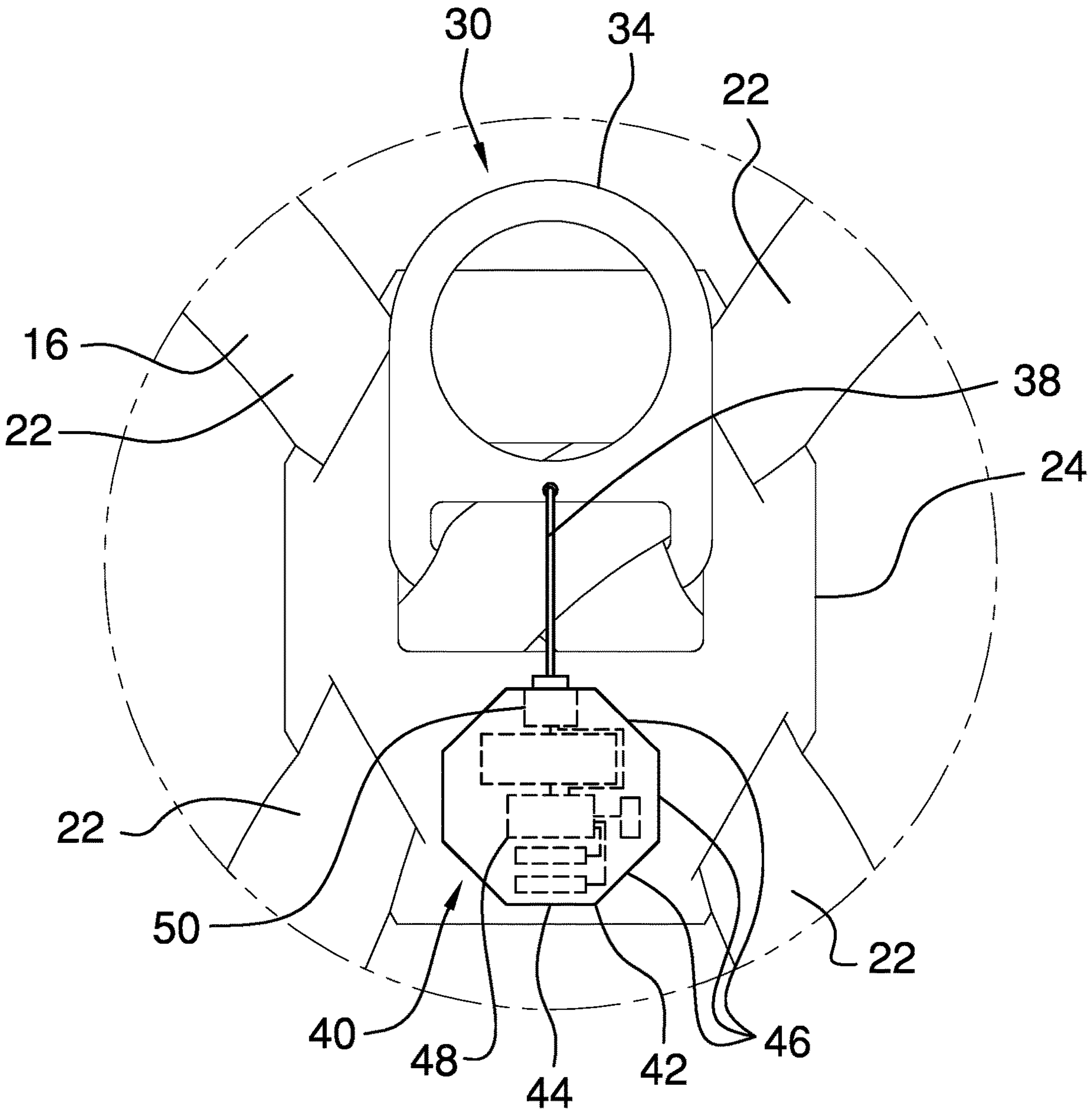
FIG. 2 is a back phantom view of a fall unit and a body harness of an embodiment of the disclosure.
Figure 3:
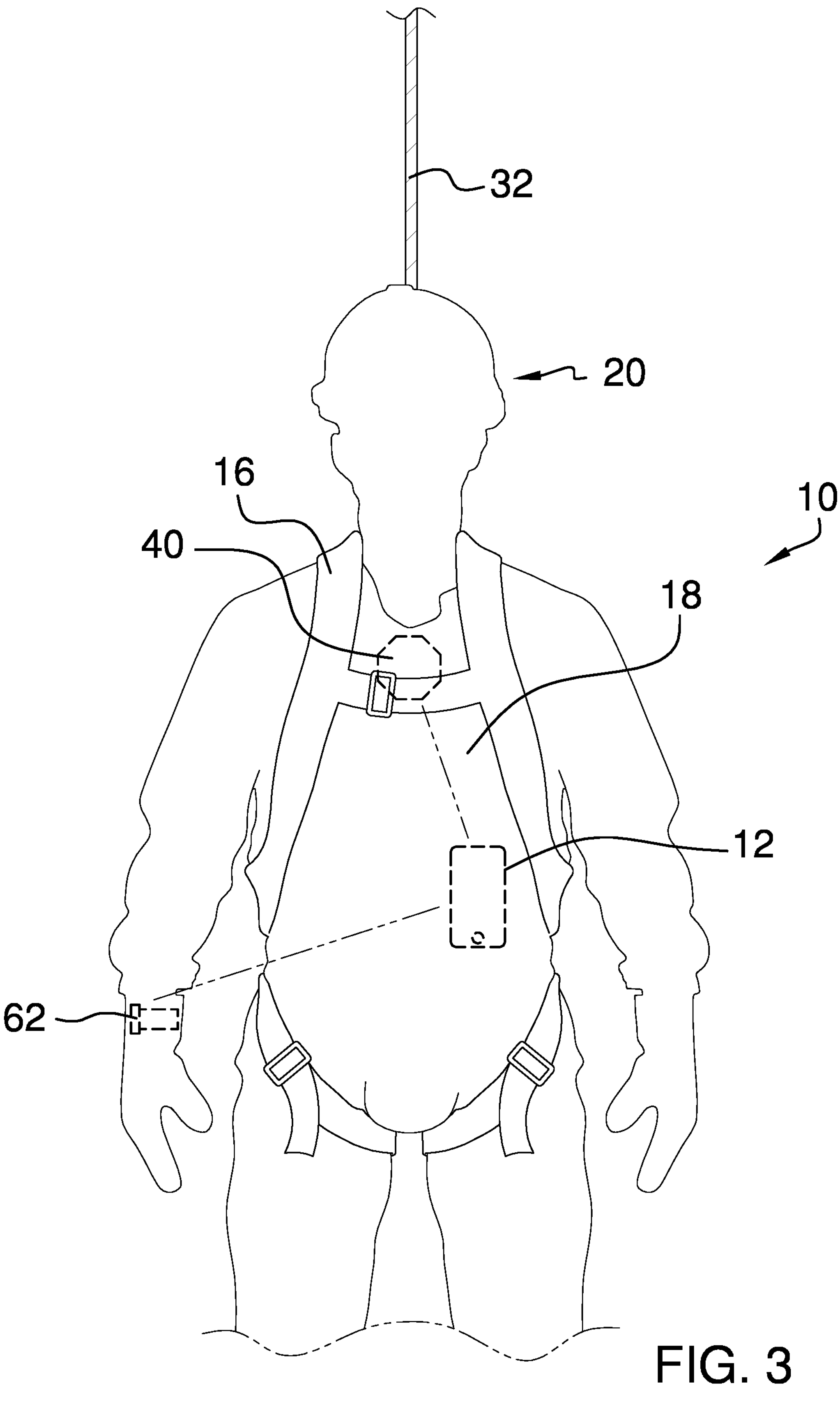
FIG. 3 is a front in-use view of an embodiment of the disclosure.
Figure 4:
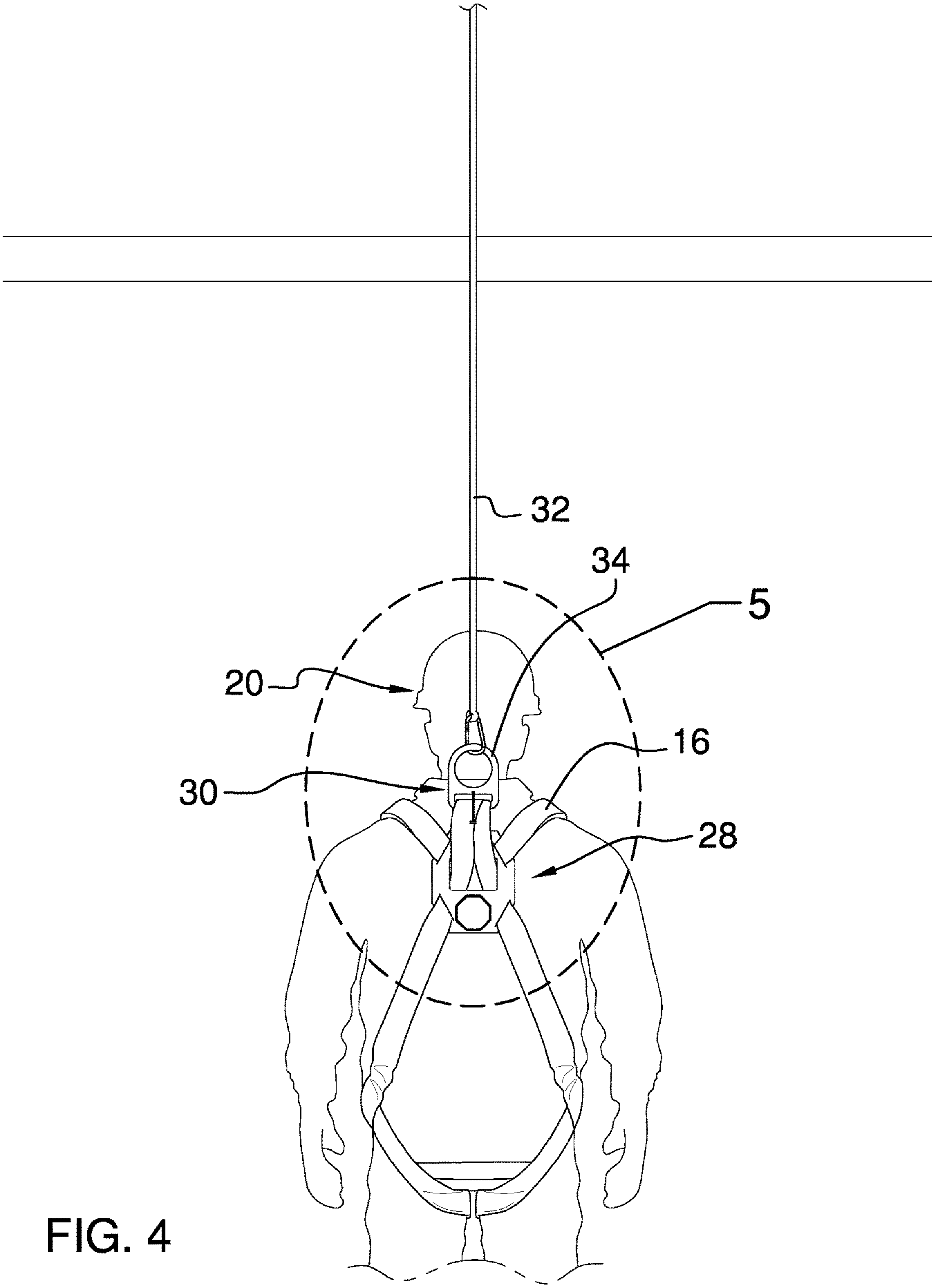
FIG. 4 is a back in-use view of an embodiment of the disclosure showing a user having fallen from an elevated location.
Figure 5:
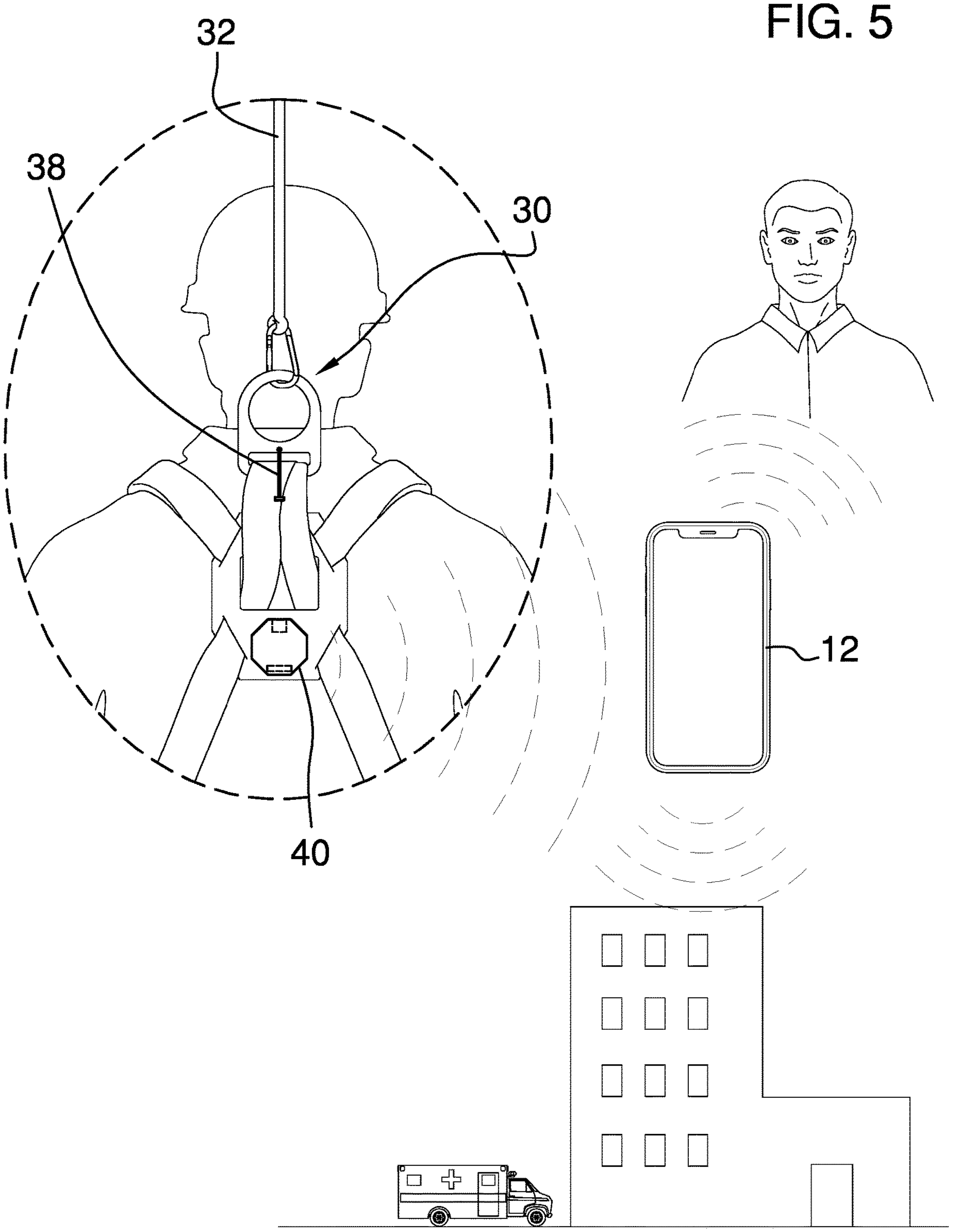
FIG. 5 is a perspective in-use view of an embodiment of the disclosure.
Figure 6:
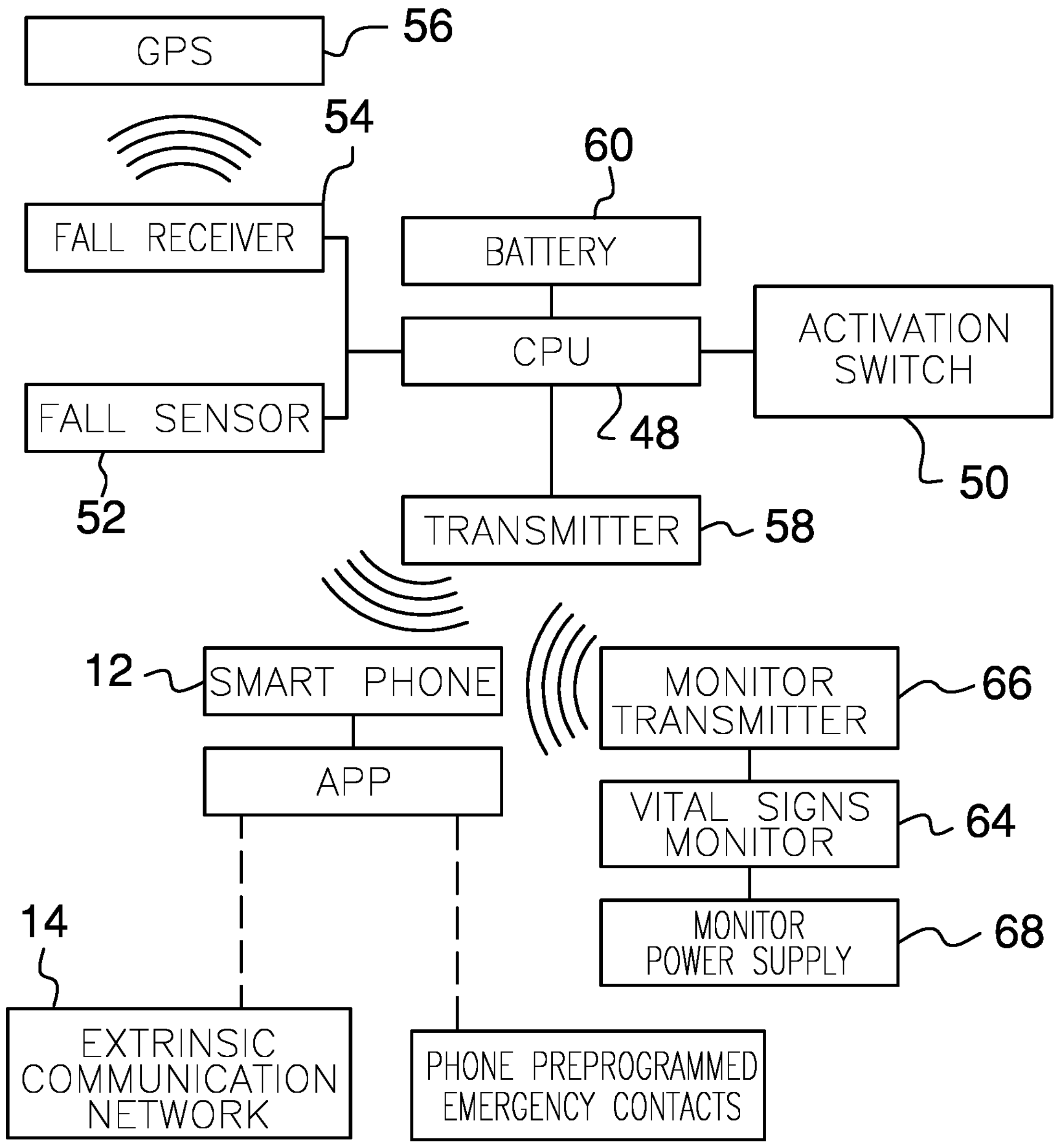
FIG. 6 is a schematic view of an embodiment of the disclosure.

With reference now to the drawings, and in particular to FIGS. 1 through 6 thereof, a new alerting device embodying the principles and concepts of an embodiment of the disclosure and generally designated by the reference numeral 10 will be described.

As best illustrated in FIGS. 1 through 6, the fall alerting assembly 10 generally comprises a personal electronic device 12 which has wireless communication capabilities to facilitate wireless communication with an extrinsic communication network 14. The personal electronic device 12 may be a smart phone or the like and the extrinsic communication network 14 may comprise a cellular phone network or other similar type of wireless communication network. Additionally, the personal electronic device 12 may store operational software, such as a smart phone application, for automatically contacting emergency responders. A body harness 16 is included that is wearable on a body 18 of a user 20 when the user 20 is at an elevated location. The body harness 16 includes a plurality of straps 22 and a panel 24 at which all of the straps 22 intersect. The straps 22 are worn around the user's body 18 such that the panel 24 is positioned on the user's back 28. The user 20 might be an elevated worker such as an aerial welder or the like, a hunter that is standing in a tree stand or any other person that is standing at a height which poses a threat of a potentially fatal fall.

An attachment 30 is movably coupled to the body harness 16 and the attachment 30 is attachable to a safety line 32. The safety line 32 has a length sufficient to prevent the user 20 from striking the ground when the user 20 falls from the elevated location. The attachment 30 includes a ring 34 that is coupled to the straps 22 and the ring 34 lies against the panel 24 when there is no tension on the safety line 32. Conversely, the ring 34 is pulled upwardly on the panel 24 having the ring 34 being displaced from the panel 24 when tension is applied to the safety line 32. A cord 38 is coupled to and extends away from the attachment 30.

A fall unit 40 is integrated into the body harness 16 and the cord 38 is removably attached to the fall unit 40. The cord 38 breaks away from the fall unit 40 when the user 20 falls from the elevated location. Moreover, the fall unit 40 broadcasts an alert signal to the personal electronic device 12 when the cord 38 breaks away from the fall unit 40. In this way the personal electronic device 12 can alert emergency responders to assist the user 20.

The fall unit 40 comprises a housing 42 that is integrated into the panel 24 of the body harness 16. The housing 42 has an outer wall 44 and the outer wall 44 has a plurality of intersecting sides 46 such that the housing 42 has an octagonal shape. The fall unit 40 includes a fall control circuit 48 that is integrated into the housing 42 and the fall control circuit 48 receives a fall input. The fall unit 40 includes a fall switch 50 that is integrated into the housing 42 and the fall switch 50 is electrically coupled to the fall control circuit 48. The cord 38 is removably attached to the fall switch 50 and the fall switch 50 is actuated when the cord 38 is disconnected from the fall switch 50. Moreover, the fall control circuit 48 receives the fall input when the fall switch 50 is actuated.

The fall unit 40 includes a fall sensor 52 that is integrated into the housing 42 and the fall sensor 52 is electrically coupled to the fall control circuit 48. The fall sensor 52 senses acceleration such that the fall sensor 52 can sense when the user 20 has fallen from the elevated location. Additionally, the fall control circuit 48 receives the fall input when the fall sensor 52 senses acceleration. The fall sensor 52 may comprise an electronic accelerometer or other similar device that can measure acceleration.

The fall unit 40 includes a fall receiver 54 that is integrated into the housing 42 and the fall receiver 54 is electrically coupled to the fall control circuit 48. The fall receiver 54 is in wireless communication with a global positioning system 56 to receive the physical location of the housing 42 from the global positioning system 56. Additionally, the fall receiver 54 is turned on when the fall control circuit 48 receives the fall input, and the fall receiver 54 may comprise a radio frequency receiver or the like.

The fall unit 40 includes a fall transmitter 58 that is integrated into the housing 42 and the fall transmitter 58 is electrically coupled to the fall control circuit 48. The fall transmitter 58 broadcasts the alert signal when the fall control circuit 48 receives the fall input, and the alert signal includes the location received from the global positioning system 56. In this way the emergency responders can be notified of the location of the user 20. The fall transmitter 58 is in wireless communication with the personal electronic device 12 such that the personal electronic device 12 can relay the physical location to the emergency responders. The fall transmitter 58 may comprise radio frequency fall transmitter or the like and the fall transmitter 58 may employ Bluetooth communication protocols. The fall unit 40 includes a fall power supply 60 that is integrated into the housing 42. The fall power supply 60 is electrically coupled to the fall control circuit 48 and the fall power supply 60 comprises at least one battery.

A wrist monitor 62 is provided and the wrist monitor 62 is wearable on the user's wrist 64. The wrist monitor 62 is in physical contact with the user 20 when the wrist monitor 62 is being worn. In this way the wrist monitor 62 can monitor the user's 20 vital signs. Moreover, the wrist monitor 62 is in wireless communication with the personal electronic device 12. The wrist monitor 62 includes a plurality of vital sign sensors 64 that is each integrated into the wrist monitor 62. Each of the vital sign sensors 64 senses a respective one of the user's 20 vital signs when the wrist monitor 62 is worn, including but not being limited to, blood pressure, pulse, body temperature and blood oxygen levels. Each of the vital sign sensors 64 may comprise an electronic sensor that is designed to sense specific bodily functions.

The wrist monitor 62 includes a monitor transmitter 66 that is integrated into the wrist monitor 62, and the monitor transmitter 66 is electrically coupled to the plurality of vital sign sensors 64. The monitor transmitter 66 is in wireless communication with the personal electronic device 12 for broadcasting the user's 20 vital signs to the personal electronic device 12. Additionally, the monitor transmitter 66 may comprise a radio frequency transmitter or the like and the monitor transmitter 66 may employ Bluetooth communication protocols. A monitor power supply 68 is integrated into the wrist monitor 62. The monitor power supply 68 is electrically coupled to the monitor transmitter 66 and each of the vital sign sensors 64, and the monitor power supply 68 comprises at least one battery.

In use, the wrist monitor 62 is worn on the user's wrist 64, the body harness 16 is worn on the user's body 18 and the safety line 32 is connected to the ring 34 on the attachment 30 when the user 20 expects to be standing in an elevated location. Additionally, each of the fall transmitter 58 and the monitor transmitter 66 are synched with the personal electronic device 12. The fall transmitter 58 broadcasts the alert signal when the user 20 falls from the elevated location and the personal electronic device 12 contacts the emergency responders. In this way the emergency responders can immediately travel to the user's 20 location to render assistance. Additionally, the wrist monitor 62 continually monitors the user's 20 vital signs while the emergency responders are travelling to the user's 20 location.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A fall alerting assembly for contacting emergency responders when a user experiences a fall while wearing a safety harness, said assembly comprising:

a personal electronic device, said personal electronic device having wireless communication capabilities wherein said personal electronic device is configured to be in wireless communication with an extrinsic communication network;

a body harness being wearable on a body of the user when the user is at an elevated location, said body harness including a plurality of straps and a panel at which all of said straps intersect wherein said straps are configured to be worn around user's body having said panel being positioned on the user's back;

an attachment being movably coupled to said body harness, said attachment being attachable to a safety line wherein said attachment is configured to facilitate the safety line to prevent the user from striking the ground when the user falls from the elevated location, said attachment including a ring, said plurality of straps extending through said attachment adjacent to said ring such that said ring is positioned lying against said panel when there is no tension on the safety line, said ring being pulled upwardly on said panel having said ring being displaced from said panel when tension is applied to the safety line;

a cord being coupled to and extending away from said attachment a fall unit being integrated into said body harness, said fall unit having said cord being removably attached thereto, said cord breaking away from said fall unit when the user falls from the elevated location, said fall unit broadcasting an alert signal to said personal electronic device when said cord breaks away from said fall unit wherein said personal electronic device is configured to alert emergency responders to assist the user; and a wrist monitor being wearable on the user's wrist, said wrist monitor being in physical contact with the user when said wrist monitor is being worn wherein said wrist monitor is configured to monitor the user's vital signs, said wrist monitor being in wireless communication with said personal electronic device.

2. The assembly according to claim 1, wherein said fall unit comprises:

a housing being integrated into said panel of said body harness, said housing having an outer wall, said outer wall having a plurality of intersecting sides such that said housing has an octagonal shape;

a fall control circuit being integrated into said housing, said fall control circuit receiving a fall input;

a fall switch being integrated into said housing, said fall switch being electrically coupled to said fall control circuit, said cord being removably attached to said fall switch, said fall switch being actuated when said cord is disconnected from said fall switch, said fall control circuit receiving said fall input when said fall switch is actuated; and a fall sensor being integrated into said housing, said fall sensor being electrically coupled to said fall control circuit, said fall sensor sensing acceleration wherein said fall sensor is configured to sense when the user has fallen from the elevated location, said control circuit receiving said fall input when said fall sensor senses acceleration.

3. The assembly according to claim 2, wherein said fall unit includes a fall receiver being integrated into said housing, said fall receiver being electrically coupled to said fall control circuit, said fall receiver being in wireless communication a global positioning system wherein said fall receiver is configured to receive the physical location of said housing from the global positioning system, said fall receiver being turned on when said fall control circuit receives said fall input.

4. The assembly according to claim 3, wherein said fall unit includes a transmitter being integrated into said housing, said transmitter being electrically coupled to said fall control circuit, said transmitter broadcasting said alert signal when said fall control circuit receives said fall input, said alert signal including the location received from the global positioning system, said transmitter being in wireless communication with said personal electronic device.

5. The assembly according to claim 1, wherein said wrist monitor includes:

a plurality of vital sign sensors, each of said vital sign sensors being integrated into said wrist monitor wherein each of said vital sign sensors is configured to sense a respective one of the user's vital signs when said wrist monitor is worn;

a monitor transmitter being integrated into said wrist monitor, said monitor transmitter being electrically coupled to said plurality of vital sign sensors, said monitor transmitter being in wireless communication with said personal electronic device for broadcasting the user's vital signs to said personal electronic device; and a monitor power supply being integrated into said wrist monitor, said monitor power supply being electrically coupled to said monitor transmitter and each of said vital sign sensors, said monitor power supply comprising at least one battery.

6. A fall alerting assembly for contacting emergency responders when a user experiences a fall while wearing a safety harness, said assembly comprising:

a personal electronic device, said personal electronic device having wireless communication capabilities wherein said personal electronic device is configured to be in wireless communication with an extrinsic communication network;

a body harness being wearable on a body of the user when the user is at an elevated location, said body harness including a plurality of straps and a panel at which all of said straps intersect wherein said straps are configured to be worn around user's body having said panel being positioned on the user's back;

an attachment being movably coupled to said body harness, said attachment being attachable to a safety line wherein said attachment is configured to facilitate the safety line to prevent the user from striking the ground when the user falls from the elevated location, said attachment including a ring, said plurality of straps extending through said attachment adjacent to said ring such that said ring is positioned lying against said panel when there is no tension on the safety line, said ring being pulled upwardly on said panel having said ring being displaced from said panel when tension is applied to the safety line;

a cord being coupled to and extending away from said attachment a fall unit being integrated into said body harness, said fall unit having said cord being removably attached thereto, said cord breaking away from said fall unit when the user falls from the elevated location, said fall unit broadcasting an alert signal to said personal electronic device when said cord breaks away from said fall unit wherein said personal electronic device is configured to alert emergency responders to assist the user, said fall unit comprising:

a housing being integrated into said panel of said body harness, said housing having an outer wall, said outer wall having a plurality of intersecting sides such that said housing has an octagonal shape;

a fall control circuit being integrated into said housing, said fall control circuit receiving a fall input;

a fall switch being integrated into said housing, said fall switch being electrically coupled to said fall control circuit, said cord being removably attached to said fall switch, said fall switch being actuated when said cord is disconnected from said fall switch, said fall control circuit receiving said fall input when said fall switch is actuated;

a fall sensor being integrated into said housing, said fall sensor being electrically coupled to said fall control circuit, said fall sensor sensing acceleration wherein said fall sensor is configured to sense when the user has fallen from the elevated location, said control circuit receiving said fall input when said fall sensor senses acceleration;

a fall receiver being integrated into said housing, said fall receiver being electrically coupled to said fall control circuit, said fall receiver being in wireless communication a global positioning system wherein said fall receiver is configured to receive the physical location of said housing from the global positioning system, said fall receiver being turned on when said fall control circuit receives said fall input;

a transmitter being integrated into said housing, said transmitter being electrically coupled to said fall control circuit, said transmitter broadcasting said alert signal when said fall control circuit receives said fall input, said alert signal including the location received from the global positioning system, said transmitter being in wireless communication with said personal electronic device; and a fall power supply being integrated into said housing, said fall power supply being electrically coupled to said fall control circuit, said fall power supply comprising at least one battery;

a wrist monitor being wearable on the user's wrist, said wrist monitor being in physical contact with the user when said wrist monitor is being worn wherein said wrist monitor is configured to monitor the user's vital signs, said wrist monitor being in wireless communication with said personal electronic device, said wrist monitor including:

a plurality of vital sign sensors, each of said vital sign sensors being integrated into said wrist monitor wherein each of said vital sign sensors is configured to sense a respective one of the user's vital signs when said wrist monitor is worn;

a monitor transmitter being integrated into said wrist monitor, said monitor transmitter being electrically coupled to said plurality of vital sign sensors, said monitor transmitter being in wireless communication with said personal electronic device for broadcasting the user's vital signs to said personal electronic device; and a monitor power supply being integrated into said wrist monitor, said monitor power supply being electrically coupled to said monitor transmitter and each of said vital sign sensors, said monitor power supply comprising at least one battery.

* * * * *